United States Patent
Qi et al.

(10) Patent No.: US 12,508,214 B2
(45) Date of Patent: Dec. 30, 2025

(54) PERSONAL CARE RINSE OFF COMPOSITION WITH COMPOSITE OPACIFIER PARTICLES

(71) Applicants: Dow Global Technologies LLC, Midland, MI (US); Rohm and Haas Company, Collegeville, PA (US)

(72) Inventors: Luqing Qi, Midland, MI (US); Ying O'Connor, Coatesville, PA (US); Yuanqiao Rao, Berwyn, PA (US); David L. Malotky, Midland, MI (US); Eric Wasserman, Collegeville, PA (US); Fanwen Zeng, Audubon, PA (US); Junsi Gu, Malvern, PA (US); Stephanie A. Bloxom, Midland, MI (US)

(73) Assignees: Dow Global Technologies LLC, Midland, IA (US); Rohm and Haas Company, Collegeville, PA (US)

( * ) Notice: Subject to any disclaimer, the term of this patent is extended or adjusted under 35 U.S.C. 154(b) by 285 days.

(21) Appl. No.: 18/251,037

(22) PCT Filed: Dec. 2, 2021

(86) PCT No.: PCT/US2021/061507
§ 371 (c)(1),
(2) Date: Apr. 28, 2023

(87) PCT Pub. No.: WO2022/125358
PCT Pub. Date: Jun. 16, 2022

(65) Prior Publication Data
US 2023/0404875 A1    Dec. 21, 2023

Related U.S. Application Data

(60) Provisional application No. 63/122,072, filed on Dec. 7, 2020.

(51) Int. Cl.
*A61K 8/00*    (2006.01)
*A61K 8/29*    (2006.01)
*A61Q 5/02*    (2006.01)
*A61Q 19/10*   (2006.01)

(52) U.S. Cl.
CPC .............. *A61K 8/29* (2013.01); *A61Q 5/02* (2013.01); *A61Q 19/10* (2013.01)

(58) Field of Classification Search
None
See application file for complete search history.

(56) References Cited

U.S. PATENT DOCUMENTS

| | | |
|---|---|---|
| 5,939,079 A | 8/1999 | Le Royer et al. |
| 8,119,698 B2 | 2/2012 | Polonka et al. |
| 8,829,083 B2 | 9/2014 | Lundgard et al. |
| 9,517,190 B2 | 12/2016 | Johncock et al. |
| 2011/0165207 A1 | 7/2011 | Nolte |
| 2011/0195099 A1 | 8/2011 | Nolte et al. |

FOREIGN PATENT DOCUMENTS

| | | | | |
|---|---|---|---|---|
| CA | 2651491 A1 | * | 11/2007 | ............. A61K 8/062 |
| WO | 2012110302 | | 8/2012 | |

OTHER PUBLICATIONS

Sibilia, "A Guide to Materials Characterization and Chemical Analysis", VCH, 1988, pp. 81-84.
Yau, Modern Size Exclusion Chromatography, Wiley-Interscience, 1979.

* cited by examiner

*Primary Examiner* — Necholus Ogden, Jr.
(74) *Attorney, Agent, or Firm* — Thomas S. Deibert

(57) ABSTRACT

An aqueous personal care rinse off composition is provided, comprising: a dermatologically acceptable aqueous vehicle; a dermatologically acceptable cleaning surfactant; and a plurality of composite opacifier particles, wherein the composite opacifier particles comprise metal oxide particles that are partially or completely encapsulated by a wax; wherein the metal oxide particles are selected from the group consisting of zinc oxide, titanium oxide and mixtures thereof; wherein the metal oxide particles have a z average particle size of >100 nm as measured by dynamic light scattering; wherein the wax has a melting point temperature of 50 to 110° C.; and wherein the composite opacifier particles have a z average particle size of >100 nm to 2,000 nm as measured by dynamic light scattering.

13 Claims, No Drawings

PERSONAL CARE RINSE OFF COMPOSITION WITH COMPOSITE OPACIFIER PARTICLES

The present invention relates to an aqueous personal care rinse off composition. In particular, the present invention relates to an aqueous personal care rinse off composition, comprising: a dermatologically acceptable aqueous vehicle; a dermatologically acceptable cleaning surfactant; and a plurality of composite opacifier particles, wherein the composite opacifier particles comprise metal oxide particles that are partially or completely encapsulated by a wax; wherein the metal oxide particles are selected from the group consisting of zinc oxide, titanium oxide and mixtures thereof; wherein the metal oxide particles have a z average particle size of >100 nm as measured by dynamic light scattering; wherein the wax has a melting point temperature of 45 to 110° C.; and wherein the composite opacifier particles have a z average particle size of >100 nm to 2,000 nm as measured by dynamic light scattering.

In addition to cleaning performance, the aesthetic look and feel of a detergent is an important consideration for consumers. Thus, detergents typically contain a variety of ingredients that impact functionality, aesthetics, or both, including, for instance, surfactants, solvents, optional builder, and opacifiers.

Opacifiers are materials that make a liquid system opaque. Thus, opacifiers are used to modify the appearance or aesthetics of detergents, for instance, by transforming the liquid from clear or translucent to opaque. Opacifiers can provide a uniform, luxurious, "lotionized" appearance to a liquid product. Opacifiers are usually formed of submicron sized particles that are delivered to a formulation as a suspension of the particles in a solvent (typically water).

Since opacifiers are targeted to a formulation's aesthetics, it is generally desirable that their inclusion not interfere with the function of the formulation or otherwise negatively impact the formulation. For instance, opacifiers that exhibit limited compatibility with other materials in the formulation, have issues with stability, exhibit spotting or residue formation, are not favored. In addition, opacifiers that introduce large amounts of water into a formulation, e.g., by being effective only when used in large quantities, are also not favored, particularly for those formulations where limiting the quantity of water is desired, such as in concentrated detergents or unit dose packets.

Accordingly, there remains a need for more sustainable opacifiers for use in aqueous personal care rinse off compositions; particularly wherein the sustainable opacifiers perform on par with conventional styrene acrylic copolymer based opacifiers.

The present invention provides an aqueous personal care rinse off composition, comprising: a dermatologically acceptable aqueous vehicle; a dermatologically acceptable cleaning surfactant; and a plurality of composite opacifier particles, wherein the composite opacifier particles comprise metal oxide particles that are partially or completely encapsulated by a wax; wherein the metal oxide particles are selected from the group consisting of zinc oxide, titanium oxide and mixtures thereof; wherein the metal oxide particles have a z average particle size of >100 nm as measured by dynamic light scattering; wherein the wax has a melting point temperature of 45 to 110° C.; and wherein the composite opacifier particles have a z average particle size of >100 nm to 2,000 nm as measured by dynamic light scattering.

The present invention provides a method of cleaning at least one of mammalian skin and hair, comprising: (a) applying a personal care rinse off formulation according to the present invention to the skin or hair of a mammal; and (b) rinsing the personal care rinse off formulation from the skin or hair with a rinse water.

DETAILED DESCRIPTION

We have surprisingly found that composite opacifier particles comprising metal oxide particles partially or completely encapsulated by a wax (preferably a natural wax) can be stably incorporated into aqueous personal care rinse off compositions to provide opacification on par with conventional styrene acrylate copolymer based opacifiers, while increasing the overall sustainability of the aqueous personal care rinse off composition.

Unless otherwise indicated, ratios, percentages, parts, and the like are by weight.

As used herein, unless otherwise indicated, the phrase "molecular weight" or $M_W$ refers to the weight average molecular weight as measured in a conventional manner with gel permeation chromatography (GPC) and poly(ethylene oxide) standards. GPC techniques are discussed in detail in Modern Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. Molecular weights are reported herein in units of Daltons, or equivalently, g/mol.

The term "dermatologically acceptable" as used herein and in the appended refers to ingredients that are typically used for topical application to the skin, and is intended to underscore that materials that are toxic when present in the amounts typically found in skin care compositions are not contemplated as part of the present invention.

Preferably, the aqueous personal care rinse off composition of the present invention is selected from the group consisting of a shampoo, a conditioning shampoo, a body wash formulation, an exfoliating body wash formulation, a facial wash formulation, an exfoliating facial wash formulation, a liquid hand soap formulation, a sulfate-free cleansing formulation and a mild cleansing formulation. More preferably, the aqueous personal care rinse off composition of the present invention is selected from the group consisting of a body wash formulation, a facial wash formulation and a liquid hand soap formulation. Most preferably, the aqueous personal care rinse off composition of the present invention is a body wash formulation.

Preferably, the aqueous personal care rinse off composition of the present invention, comprises: a dermatologically acceptable aqueous vehicle (preferably, wherein the aqueous personal care rinse off composition comprises 25 to 99 wt % (preferably, 30 to 95 wt %; more preferably, 40 to 90 wt %; most preferably, 70 to 85 wt %), based on weight of the aqueous personal care rinse off composition, of a dermatologically acceptable aqueous vehicle); a dermatologically acceptable cleaning surfactant (preferably, wherein the aqueous personal care rinse off composition comprises 0.5 to 60 wt % (preferably, 1 to 50 wt %; more preferably, 5 to 30 wt %; most preferably, 7 to 20 wt %), based on weight of the aqueous personal care rinse off composition, of a dermatologically acceptable cleaning surfactant); and a plurality of composite opacifier particles (preferably, wherein the aqueous personal care rinse off composition comprises 0.05 to 10 wt % (preferably, 0.1 to 7.5 wt %; more preferably, 0.5 to 5 wt %; most preferably, 0.75 to 3.0 wt %), based on weight of the aqueous personal care rinse off composition, of a plurality of composite opacifier particles), wherein the composite opacifier particles comprise metal oxide particles that are partially or completely encapsulated by a wax; wherein the metal oxide particles are selected from the group consisting of zinc oxide, titanium oxide and mixtures thereof; wherein the metal oxide particles have a z average particle size of >100 nm (preferably, 110 nm to 500 nm; more preferably, 150 nm to 400 nm; most preferably, 175 to 275 nm) as measured by dynamic light scattering (e.g, with a Brookhaven particle size analyzer); wherein the wax has a melting point temperature of 45 to 110° C. (preferably, 65 to 100° C.; more preferably, 75 to 90° C.; most preferably, 80 to 90° C.); and wherein the composite opacifier particles have a z average particle size of >100 nm to 2,000 nm (preferably, 200 nm to 1,000 nm; more preferably, 250 nm to 750 nm; most preferably, 300 nm to 500 nm) as measured by dynamic light scattering (e.g., with a Beckman Coulter Particle Size Analyzer with a Universal Liquid Module).

Preferably, the aqueous personal care rinse off composition of the present invention, comprises a dermatologically acceptable aqueous vehicle. More preferably, the aqueous personal care rinse off composition of the present invention, comprises: 25 to 99 wt % (preferably, 30 to 95 wt %; more preferably, 40 to 90 wt %; most preferably, 70 to 85 wt %), based on weight of the aqueous personal care rinse off composition, of a dermatologically acceptable aqueous vehicle. Still more preferably, the aqueous personal care rinse off composition of the present invention, comprises: 25 to 99 wt % (preferably, 30 to 95 wt %; more preferably, 40 to 90 wt %; most preferably, 70 to 85 wt %), based on weight of the aqueous personal care rinse off composition, of a dermatologically acceptable aqueous vehicle; wherein the dermatologically acceptable aqueous vehicle comprises water. Yet more preferably, the aqueous personal care rinse off composition of the present invention, comprises: 25 to 99 wt % (preferably, 30 to 95 wt %; more preferably, 40 to 90 wt %; most preferably, 70 to 85 wt %), based on weight of the aqueous personal care rinse off composition, of a dermatologically acceptable aqueous vehicle; wherein the dermatologically acceptable aqueous vehicle is selected from the group consisting of water and an aqueous $C_{1-4}$ alcohol mixture. Most preferably, the aqueous personal care rinse off composition of the present invention, comprises: 25 to 99 wt % (preferably, 30 to 95 wt %; more preferably, 40 to 90 wt %; most preferably, 70 to 85 wt %), based on weight of the aqueous personal care rinse off composition, of a dermatologically acceptable aqueous vehicle, wherein the dermatologically acceptable aqueous vehicle is water.

Preferably, the water used in the aqueous personal care rinse off composition of the present invention is at least one of distilled water and deionized water. More preferably, the water used in the aqueous personal care rinse off composition of the present invention is distilled and deionized.

Preferably, the aqueous personal care rinse off composition of the present invention comprises 0.5 to 60 wt % (preferably, 1 to 50 wt %; more preferably, 5 to 30 wt %; most preferably, 7 to 20 wt %), based on weight of the aqueous personal care rinse off composition, of a dermatologically acceptable cleaning surfactant. More preferably, the aqueous personal care rinse off composition of the present invention comprises 0.5 to 60 wt % (preferably, 1 to 50 wt %; more preferably, 5 to 30 wt %; most preferably, 7 to 20 wt %), based on weight of the aqueous personal care rinse off composition, of a dermatologically acceptable cleaning surfactant; wherein the dermatologically acceptable cleaning surfactant is selected from the group consisting of alkyl polyglucosides (e.g., lauryl glucoside, cocoglucoside, decyl glucoside), glycinates (e.g., sodium cocoyl glycinate), betaines (e.g., alkyl betaines such as trimethylglycine and cetyl betaine; and amido betaines such as cocamidopropyl betaine), taurates (e.g., sodium methyl cocoyl taurate), glutamates (e.g., sodium cocoyl glutamate), sarcosinates (e.g., sodium lauroyl sarcosinate), isethionates (e.g., sodium cocoyl isethionate, sodium lauroyl methyl isethionate), sulfoacetates (e.g., sodium lauryl sulfoacetate), alaninates (e.g., sodium cocoyl alaninate), amphoacetates (e.g., sodium cocoamphoacetate), sulfates (e.g., sodium laureth sulfate (SLES)), sulfonates (e.g., sodium $C_{14-16}$ olefin sulfonate), succinates (e.g., disodium lauryl sulfosuccinate); fatty alkanolamides (e.g., cocamide monoethanolamine, cocamide, diethanolamine, soyamide diethanolamine, lauramide diethanolamine, oleamide monoisopropanolamine, stearamide monoethanolamine, myristamide monoethanolamine, lauramide monoethanolamine, capramide diethanolamine, ricinoleamide diethanolamine, myristamide diethanolamine, stearamide diethanolamine, oleylamide diethanolamine, tallowamide diethanolamine, lauramide monoisopropanolamine, tallowamide monoethanolamine, isostearamide diethanolamine, isostearamide diethanolamine, isostearamide monoethanolamine) and mixtures thereof. Still more preferably, the aqueous personal care rinse off composition of the present invention comprises 0.5 to 60 wt % (preferably, 1 to 50 wt %; more preferably, 5 to 30 wt %; most preferably, 7 to 20 wt %), based on weight of the aqueous personal care rinse off composition, of a dermatologically acceptable cleaning surfactant; wherein the dermatologically acceptable cleaning surfactant includes a mixture of sodium laureth sulfate (SLES) and trimethylglycine. Most preferably, the aqueous personal care rinse off composition of the present invention comprises 0.5 to 60 wt % (preferably, 1 to 50 wt %; more preferably, 5 to 30 wt %; most preferably, 7 to 20 wt %), based on weight of the aqueous personal care rinse off composition, of a dermatologically acceptable cleaning surfactant; wherein the dermatologically acceptable cleaning surfactant is a mixture of sodium laureth sulfate (SLES) and trimethylglycine.

Preferably, the aqueous personal care rinse off composition of the present invention comprises 0.05 to 10 wt % (preferably, 0.1 to 7.5 wt %; more preferably, 0.5 to 5 wt %; most preferably, 0.75 to 3 wt %), based on weight of the aqueous personal care rinse off composition, of a plurality of composite opacifier particles; wherein the composite opacifier particles comprises metal oxide particles that are partially or completely encapsulated (preferably, 50 to 100% encapsulated; more preferably, 75 to 100% encapsulated; most preferably, 90 to 100% encapsulated) by a wax; wherein the metal oxide particles are selected from the group consisting of zinc oxide, titanium oxide and mixtures thereof; wherein the metal oxide particles have a z average particle size of >100 nm (preferably, 110 nm to 500 nm; more preferably, 150 nm to 400 nm; most preferably, 175 to 275 nm) as measured by dynamic light scattering (e.g, with a Brookhaven particle size analyzer); wherein the wax has a melting point temperature of 45 to 110° C. (preferably, 65 to 100° C.; more preferably, 75 to 90° C.; most preferably, 80 to 90° C.); and wherein and wherein the composite opacifier particles have a z average particle size of >100 nm to 2,000 nm (preferably, 200 nm to 1,000 nm; more preferably, 250 nm to 750 nm; most preferably, 300 nm to 500 nm) as measured by dynamic light scattering (e.g., with a Beckman Coulter Particle Size Analyzer with a Universal Liquid Module). More preferably, the aqueous personal care rinse off composition of the present invention comprises 0.05 to 10 wt % (preferably, 0.1 to 7.5 wt %; more preferably, 0.5 to 5 wt %; most preferably, 0.75 to 3 wt %), based on weight of the aqueous personal care rinse off composition, of a plurality of composite opacifier particles; wherein the composite opacifier particles comprises metal oxide particles that are partially or completely encapsulated (preferably, 50 to 100% encapsulated; more preferably, 75 to 100% encapsulated; most preferably, 90 to 100% encapsulated) by a wax; wherein the composite opacifier particles comprise 1 to 40 wt % (preferably, 2 to 30 wt %; more preferably, 3 to 25 wt %; most preferably, 5 to 20 wt %), based on weight of the composite opacifier particles, of the metal oxide particles; wherein the metal oxide particles are selected from the group consisting of zinc oxide, titanium oxide and mixtures thereof; wherein the metal oxide particles have a z average particle size of >100 nm (preferably, 110 nm to 500 nm; more preferably, 150 nm to 400 nm; most preferably, 175 to 275 nm) as measured by dynamic light scattering (e.g, with a Brookhaven particle size analyzer); wherein the composite opacifier particles comprise 60 to 99 wt % (preferably, 70 to 98 wt %; more preferably, 75 to 97 wt %; most preferably, 80 to 95 wt %), based on weight of the composite opacifier particles, of a wax; wherein the wax has a melting point temperature of 45 to 110° C. (preferably, 65 to 100° C.; more preferably, 75 to 90° C.; most preferably, 80 to 90° C.); and wherein and wherein the composite opacifier particles have a z average particle size of >100 nm to 2,000 nm (preferably, 200 nm to 1,000 nm; more preferably, 250 nm to 750 nm; most preferably, 300 nm to 500 nm) as measured by dynamic light scattering (e.g., with a Beckman Coulter Particle Size Analyzer with a Universal Liquid Module). Most preferably, the aqueous personal care rinse off composition of the present invention comprises 0.05 to 10 wt % (preferably, 0.1 to 7.5 wt %; more preferably, 0.5 to 5 wt %; most preferably, 0.75 to 3 wt %), based on weight of the aqueous personal care rinse off composition, of a plurality of composite opacifier particles; wherein the composite opacifier particles comprises metal oxide particles that are partially or completely encapsulated (preferably, 50 to 100% encapsulated; more preferably, 75 to 100% encapsulated; most preferably, 90 to 100% encapsulated) by a wax; wherein the composite opacifier particles comprise 1 to 40 wt % (preferably, 2 to 30 wt %; more preferably, 3 to 25 wt %; most preferably, 5 to 20 wt %), based on weight of the composite opacifier particles, of the metal oxide particles; wherein the metal oxide particles are titanium oxide particles; wherein the titanium dioxide particles have a z average particle size of >100 nm (preferably, 110 nm to 500 nm; more preferably, 150 nm to 400 nm; most preferably, 175 to 275 nm) as measured by dynamic light scattering (e.g, with a Brookhaven particle size analyzer); wherein the composite opacifier particles comprise 60 to 99 wt % (preferably, 70 to 98 wt %; more preferably, 75 to 97 wt %; most preferably, 80 to 95 wt %), based on weight of the composite opacifier particles, of a wax; wherein the wax has a melting point temperature of 45 to 110° C. (preferably, 65 to 100° C.; more preferably, 75 to 90° C.; most preferably, 80 to 90° C.); and wherein and wherein the composite opacifier particles have a z average particle size of >100 nm to 2,000 nm (preferably, 200 nm to 1,000 nm; more preferably, 250 nm to 750 nm; most preferably, 300 nm to 500 nm) as measured by dynamic light scattering (e.g., with a Beckman Coulter Particle Size Analyzer with a Universal Liquid Module).

Preferably, the metal oxide particles are selected from the group consisting of zinc oxide, titanium oxide and mixtures thereof; wherein the metal oxide particles have a z average particle size of >100 nm (preferably, 110 nm to 500 nm; more preferably, 150 nm to 400 nm; most preferably, 175 to 275 nm) as measured by dynamic light scattering (e.g, with a Brookhaven particle size analyzer). More preferably, the metal oxide particles include titanium dioxide particles having a z average particle size of >100 nm (preferably, 110 nm to 500 nm; more preferably, 150 nm to 400 nm; most preferably, 175 to 275 nm) as measured by dynamic light scattering (e.g, with a Brookhaven particle size analyzer). Most preferably, the metal oxide particles are titanium dioxide particles having a z average particle size of >100 nm (preferably, 110 nm to 500 nm; more preferably, 150 nm to 400 nm; most preferably, 175 to 275 nm) as measured by dynamic light scattering (e.g, with a Brookhaven particle size analyzer). Preferably, the metal oxide particles have a hydrophobic surface treatment (e.g., a polysiloxane surface coating).

Preferably, the wax is a natural wax. More preferably, the wax is a natural wax selected from the group consisting of carnauba wax, candelilla wax, bayberry wax, castor wax, coco butter, esparto wax, laurel wax, japan wax, jojoba wax, ouricury wax, palm wax, rice bran wax, soy wax, shea butter, sunflower wax, tallow tree wax and mixtures thereof. More preferably, the wax is a natural wax selected from the group consisting of carnauba wax, castor wax, ouricury wax, rice bran wax and mixtures thereof. Still more preferably, the wax is a natural wax including carnauba wax. Most preferably, the wax is carnauba wax.

Preferably, the wax comprises $C_{23-31}$ paraffin, $C_{24-36}$ fatty alcohol, $C_{12-36}$ fatty acid and esters derived from $C_{9-24}$ fatty acids and $C_{12-36}$ fatty alcohols.

Preferably, the aqueous personal care rinse off composition of the present invention, optionally, further comprises at least one additional ingredient selected from the group consisting of an antimicrobial agent; a rheology modifier; a soap; a colorant; a pH adjusting agent; an antioxidant (e.g., butylated hydroxytoluene); a humectant (e.g., glycerin, sorbitol, monoglycerides, lecithins, glycolipids, fatty alcohols, fatty acids, polysaccharides, sorbitan esters, polysorbates (e.g., Polysorbate 20, Polysorbate 40, Polysorbate 60, and Polysorbate 80), diols (e.g., propylene glycol), diol analogs, triols, triol analogs, cationic polymeric polyols); a foaming agent; an emulsifying agent; a fragrance; a chelating agent; a preservative (e.g., benzoic acid, sorbic acid, phenoxyethanol); a bleaching agent; a lubricating agent; a sensory modifier; a sunscreen additive; a vitamin; a protein/amino acid; a plant extract; a bioactive agent; an anti-aging agent; a penetrant; an anti-static agent; an absorbent; a hard particle; a soft particle; a slip agent; a pearlizing agent; a salt and mixtures thereof. More preferably, the skin cleansing formulation of the present invention, optionally, further comprises at least one additional ingredient selected from the group consisting of at least one of an antimicrobial agent, a rheology modifier, a colorant and a pH adjusting agent.

Preferably, the aqueous personal care rinse off composition of the present invention, further comprises a rheology modifier. More preferably, the aqueous personal care rinse off formulation of the present invention, further comprises a rheology modifier; wherein the rheology modifier is selected to increase the viscosity of the aqueous personal care rinse off composition (preferably without substantially modifying the other properties of the aqueous personal care rinse off composition). Still more preferably, the aqueous personal care rinse off composition of the present invention, further comprises 0 to 10 wt % (preferably, 0.05 to 5 wt %; more preferably, 0.1 to 2.5 wt %; most preferably, 0.15 to 2.0 wt %), based on weight of the aqueous personal care rinse off composition, of a rheology modifier. Yet more preferably, the aqueous personal care rinse off composition of the present invention, further comprises 0 to 10 wt % (preferably, 0.05 to 5 wt %; more preferably, 0.1 to 2.5 wt %; most preferably, 0.15 to 2.0 wt %), based on weight of the aqueous personal care rinse off composition, of a rheology modifier; wherein the rheology modifier is selected from the group consisting of sodium chloride, cellulose, a modified cellulose, xanthan gum, an acrylates copolymer and mixtures thereof. Most preferably, the aqueous personal care rinse off composition of the present invention, further comprises 0 to 10 wt % (preferably, 0.05 to 5 wt %; more preferably, 0.1 to 2.5 wt %; most preferably, 0.15 to 2.0 wt %), based on weight of the aqueous personal care rinse off composition, of a rheology modifier; wherein the rheology modifier includes a modified cellulose; wherein the modified cellulose is a quaternized cellulose polymer (e.g., polyquaternium-10).

Preferably, the aqueous personal care rinse off composition of the present invention, further comprises an antimicrobial agent. More preferably, the aqueous personal care rinse off composition of the present invention, further comprises an antimicrobial agent; wherein the antimicrobial agent is selected from the group consisting of phenoxyethanol, benzoic acid, benzyl alcohol, sodium benzoate, DMDM hydantoin, 2-ethylhexyl glyceryl ether and isothiazolinone (e.g., methylchloroisothiazolinone, methylisothiazolinone). Still more preferably, the aqueous personal care rinse off composition of the present invention, further comprises an antimicrobial agent; wherein the antimicrobial agent is an isothiazolinone (more preferably, wherein the antimicrobial is selected from the group consisting of methylisothiazolinone, methylchloroisothiazolinone and mixtures thereof; most preferably, wherein the biocide is methylisothiazolinone). Most preferably, the aqueous personal care rinse off composition of the present invention, further comprises an antimicrobial agent; wherein the antimicrobial agent is an isothiazolinone (more preferably, wherein the antimicrobial agent is selected from the group consisting of methylisothiazolinone, methylchloroisothiazolinone and mixtures thereof; most preferably, wherein the antimicrobial agent is methylisothiazolinone); and wherein the aqueous personal care rinse off composition is a body wash formulation.

Preferably, the aqueous personal care rinse off composition of the present invention, further comprises a soap. More preferably, the aqueous personal care rinse off composition of the present invention, further comprises a soap; wherein the soap is selected from the group consisting of sodium stearate, sodium laurate, sodium tallowate, sodium palmitate, potassium stearate, potassium laurate, potassium tallowate, potassium palmitate and mixtures thereof. Still more preferably, the aqueous personal care rinse off composition of the present invention, further comprises a soap; wherein the soap is selected from the group consisting of sodium stearate, sodium laurate, potassium stearate, potassium laurate and mixtures thereof. Yet more preferably, the aqueous personal care rinse off composition of the present invention, further comprises a soap; wherein the soap is selected from the group consisting of sodium stearate, potassium stearate and mixtures thereof. Most preferably, the aqueous personal care rinse off composition of the present invention, further comprises a soap; wherein the soap comprises sodium stearate.

Preferably, the aqueous personal care rinse off composition of the present invention, further comprises a soap; wherein the soap is selected from the group consisting of sodium stearate, sodium laurate, sodium tallowate, sodium palmitate, potassium stearate, potassium laurate, potassium tallowate, potassium palmitate and mixtures thereof (more preferably, wherein the soap is selected from the group consisting of sodium stearate, sodium laurate, potassium stearate, potassium laurate and mixtures thereof; still more preferably, wherein the soap is selected from the group consisting of sodium stearate, potassium stearate and mixtures thereof; most preferably, wherein the soap is sodium stearate); and wherein the aqueous personal care rinse off composition is a body wash formulation.

Preferably, the aqueous personal care rinse off composition of the present invention, further comprises a pH adjusting agent. More preferably, the aqueous personal care rinse off composition of the present invention, further comprises a pH adjusting agent; wherein the aqueous personal care rinse off composition is a body wash formulation. Most preferably, the aqueous personal care rinse off composition of the present invention, further comprises a pH adjusting agent; wherein the aqueous personal care rinse off composition is a body wash formulation and wherein the body wash formulation has a pH of 4.5 to 9 (preferably, 5 to 8; most preferably, 6 to 7).

Preferably, the pH adjusting agent is selected from the group consisting of at least one of citric acid, lactic acid, hydrochloric acid, aminoethyl propanediol, triethanolamine, monoethanolamine, sodium hydroxide, potassium hydroxide, amino-2-methyl-1-propanol. More preferably, the pH adjusting agent is selected from the group consisting of at least one of citric acid, lactic acid, sodium hydroxide, potassium hydroxide, triethanolamine, amino-2-methyl-1-propanol. Still more preferably, the pH adjusting agent includes is triethanolamine. Most preferably, the pH adjusting agent is triethanolamine.

Preferably, the aqueous personal care rinse off composition of the present invention, further comprises a colorant. More preferably, the aqueous personal care rinse off composition of the present invention, further comprises a colorant; wherein the aqueous personal care rinse off composition is a body wash formulation.

Preferably, the method of cleaning at least one of mammalian skin and hair of the present invention, comprises: applying an aqueous personal care rinse off composition of the present invention to the skin or hair of a mammal; and rinsing the aqueous personal care rinse off composition from the skin or hair with a rinse water.

Some embodiments of the present invention will now be described in detail in the following Examples.

Comparative Examples CD1-CD4 and Example D1-D2: Dispersion

Dispersions were prepared in each of Comparative Examples CD1-CD4 and Examples D1-D2 by combining the components noted in TABLE 1 in a 300 mL Parr Mixing Vessel equipped with a Cowles mixer blade placed at the bottom of a 3.5 inch long stir shaft and a pulley system to allow mixer speeds up to 1,825 rpm. The wax, 30% potassium hydroxide solution, inorganic ingredient (if any) and the initial water noted in TABLE 1 were added to the Parr Mixing Vessel. The contents of the Parr Mixing Vessel were then heated with a heating mantle set at 140° C. Once the wax softened sufficiently, stirring was started at 150 rpm to facilitate even heating of the vessel contents. Once the vessel contents reached the process temperature of 140° C., the stirring speed was increased to 600 rpm. After 5 minutes, dilution water in the amount noted in TABLE 1 was added to the vessel. The heating mantle was lowered and the vessel contents were cooled to 50° C. via immersion of the vessel into a cool water bath, while maintaining the stirring speed at 600 rpm. The resulting dispersion product was tested for % solids, volume average particle size and pH.

TABLE 1

| Example | 30% wax[1] | KOH | Inorganic A[2] | Inorganic B[3] | Inorganic C[4] | Water Initial | Water Dilution | % solids | PS (in nm) | pH |
|---|---|---|---|---|---|---|---|---|---|---|
| CD1 | 50.0 | 3.37 | — | — | — | 0 | 220 | 18.0 | 1,255* | 9.5 |
| CD2 | 50.0 | 3.37 | — | — | — | 6.63 | 200 | 20.0 | 282 | 9.5 |
| CD3 | 45.0 | 3.37 | 5.0 | — | — | 6.63 | 200 | 20.0 | 1,902* | 9.5 |
| CD4 | 45.0 | 3.37 | — | — | 5.0 | 6.63 | 200 | 20.0 | 3,750* | 9.5 |
| D1 | 45.0 | 3.37 | — | 5.0 | — | 6.63 | 200 | 20.0 | 388 | 9.5 |
| D2 | 42.5 | 3.37 | — | 7.5 | — | 6.63 | 200 | 20.0 | 397 | 9.5 |

[1]Carnauba wax ($C_{23-31}$ paraffin, $C_{24-36}$ fatty alcohol, $C_{12-36}$ fatty acid and esters of $C_9$, $C_{12-36}$) available from Machado & CIA Inc.
[2]IMERCARE ® Opaque kaolin ($Al_2Si_2O_5(OH)_4$) having mean particle size of 600 nm available from Imerys Performance Minerals
[3]TI-PURE ™ R-104 $TiO_2$ mean particle size 220 nm with hydrophobic coating available from Chemours
[4]TI-PURE ™M R-101 $TiO_2$ mean particle size 290 nm with hydrophillic coating available from Chemours
*Multiple peaks observed Comparative Examples C1-C5 and Examples 1-2:
Body Wash Formulations Body wash formulations were prepared in each of Comparative Examples C1-C5 and Examples 1-2 by combining the components in the amounts listed in TABLE 2.

TABLE 2

| Example | NaCl (wt %) | SLES[1] (wt %) | Betaine[2] (wt %) | Thickener[3] (wt %) | Opacifier Type | Opacifier (wt %) | DI Water (wt %) |
|---|---|---|---|---|---|---|---|
| C1 | 0.6 | 12.0 | 2.5 | 0.2 | Product CD2 | 1.0 | q.s. 100 |
| C2 | 0.6 | 12.0 | 2.5 | 0.2 | Product CD3 | 1.0 | q.s. 100 |
| C3 | 0.6 | 12.0 | 2.5 | 0.2 | Commercial[4] | 1.0 | q.s. 100 |
| C4 | 0.6 | 12.0 | 2.5 | 0.2 | Separate[5] | 1.0 | q.s. 100 |
| C5 | 0.6 | 12.0 | 2.5 | 0.2 | Product CD4 | 1.0 | q.s. 100 |
| 1 | 0.6 | 12.0 | 2.5 | 0.2 | D1 | 1.0 | q.s. 100 |
| 2 | 0.6 | 12.0 | 2.5 | 0.2 | D2 | 1.0 | q.s. 100 |

[1]Sodium laureth sulfate (SLES) avalable from Sigma Aldrich
[2]Trimethylglycine available from Sigma Aldrich
[3]UCARE ™ Polymer JR-400 polyquaternium-10 available from The Dow Chemical Company
[4]ACUSOL ™ OP301 opacifier
[5]Separately added Carnuba wax dispersion (Product CD1, 0.98 g) and TI-PURE ™ R-104 $TiO_2$ mean particle size 220 nm with hydrophobic coating (0.02 g; available from Chemours)

Performance Testing

The formulation stability and opacity (L* value) of the body wash formulations from each of Comparative Examples C1-C5 and Examples 1-2 are reported in TABLE 3. Each formulation was filled into a 1 mL vial and imaged by Dow PICA IIU High Throughput (HTR) Imaging Station at room temperature. Image was analysed using Dow image Analysis Methods for HTR (DiamHTR) Version 2.0 in MATLAB. The analysis software was able to batch process images and integrate the whole area of sample image to calculate out the average L*a*b* color value for each sample. The calculated L* value for each sample is listed in TABLE 3.

TABLE 3

| Example | L* value | Formulation Stable |
|---|---|---|
| C1 | 84.2 | yes |
| C2 | 81.5 | no |
| C3 | 97.7 | yes |
| C4 | 88.0 | no |
| C5 | 88.2 | no |
| 1 | 92.5 | yes |
| 2 | 94.9 | yes |

We claim:
1. An aqueous personal care rinse off composition, comprising:
70 to 85 wt %, based on weight of the aqueous personal care rinse off composition, of a dermatologically acceptable aqueous vehicle, wherein the dermatologically acceptable aqueous vehicle is water;
7 to 20 wt %, based on weight of the aqueous personal care rinse off composition, of a dermatologically acceptable cleaning surfactant; and
0.75 to 3.0 wt %, based on weight of the aqueous personal care rinse off composition, of a plurality of composite opacifier particles, wherein the composite opacifier particles comprise metal oxide particles that are partially or completely encapsulated by a wax; wherein the metal oxide particles are selected from the group consisting of zinc oxide, titanium oxide and mixtures thereof; wherein the metal oxide particles have a z average particle size of 175 to 275 as measured by dynamic light scattering; wherein the wax has a melting point temperature of 45 to 110° C.; and wherein the composite opacifier particles have a z average particle size of 300 nm to 500 nm as measured by dynamic light scattering.

2. The aqueous personal care rinse off composition of claim 1, wherein the aqueous personal care rinse off composition is selected from the group consisting of a shampoo, a conditioning shampoo, a body wash formulation, an exfoliating body wash formulation, a facial wash formulation, an exfoliating facial wash formulation, a liquid hand soap formulation, a sulfate-free cleansing formulation and a mild cleansing formulation.

3. The aqueous personal care rinse off composition of claim 2, wherein the dermatologically acceptable cleaning surfactant is selected from the group consisting of alkyl polyglucosides, glycinates, betaines, taurates, glutamates, sarcosinates, isethionates, sulfoacetates, alaninates, amphoacetates, sulfates, sulfonates, succinates, fatty alkanolamides and mixtures thereof.

4. The aqueous personal care rinse off composition of claim 3, wherein the metal oxide particles are titanium dioxide particles.

5. The aqueous personal care rinse off composition of claim 4, further comprising a rheology modifier.

6. The aqueous personal care rinse off composition of claim 5, wherein the wax is a natural wax.

7. The aqueous personal care rinse off composition of claim 6, wherein the natural wax is from the group consisting of carnauba wax, Candelilla wax, bayberry wax, castor wax, coco butter, esparto wax, Japan wax, jojoba wax, laurel wax, ouricury wax, palm wax, rice bran wax, soy wax, sunflower wax, shea butter, tallow tree wax and mixtures thereof.

8. The aqueous personal care rinse off composition of claim 7, wherein the natural wax is carnauba wax.

9. A method of cleaning at least one of mammalian skin and hair, comprising:
  (a) applying an aqueous personal care rinse off composition according to claim 1 to the skin or hair of a mammal; and
  (b) rinsing the aqueous personal care rinse off composition from the skin or hair with a rinse water.

10. The aqueous personal care rinse off composition of claim 7, wherein the wax has a melting point temperature of 75 to 90° C.

11. The aqueous personal care rinse off composition of claim 7, wherein the wax has a melting point temperature of 80 to 90° C.

12. The aqueous personal care rinse off composition of claim 11, wherein the dermatologically acceptable cleaning surfactant includes a mixture of sodium laureth sulfate and trimethylglycine.

13. The aqueous personal care rinse off composition of claim 12, wherein the dermatologically acceptable cleaning surfactant is a mixture of sodium laureth sulfate and trimethylglycine.

* * * * *